(12) United States Patent
Itogawa

(10) Patent No.: US 11,360,715 B2
(45) Date of Patent: *Jun. 14, 2022

(54) PRINTER AND NON-TRANSITORY COMPUTER READABLE STORAGE MEDIUM WITH SHARED REVIEW FUNCTION

(71) Applicant: BROTHER KOGYO KABUSHIKI KAISHA, Nagoya (JP)

(72) Inventor: Yoshihiro Itogawa, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,053

(22) Filed: Oct. 5, 2020

(65) Prior Publication Data

US 2021/0072930 A1 Mar. 11, 2021

Related U.S. Application Data

(63) Continuation of application No. 16/368,948, filed on Mar. 29, 2019, now Pat. No. 10,802,767.

(30) Foreign Application Priority Data

Mar. 30, 2018 (JP) .............................. JP2018-068006

(51) Int. Cl.
*G06F 3/12* (2006.01)
*H04N 1/00* (2006.01)
*H04N 1/23* (2006.01)

(52) U.S. Cl.
CPC .......... *G06F 3/1203* (2013.01); *G06F 3/1286* (2013.01); *H04N 1/00413* (2013.01); *H04N 1/2307* (2013.01)

(58) Field of Classification Search
None
See application file for complete search history.

(56) References Cited

U.S. PATENT DOCUMENTS 9,785,914 B2 10/2017 Gupta et al.
2006/0028690 A1 2/2006 Kunori
(Continued)

FOREIGN PATENT DOCUMENTS

JP 2005-149097 A 6/2005
JP 2007-140731 A 6/2007
(Continued)

OTHER PUBLICATIONS

Adobe Systems Incorporated, "How to start a shared review (Acrobat XI)", obtained on Mar. 8, 2018 by accessing the following URL: <https://helpx.adobe.com/jp/acrobat/kb/6113.html>.
(Continued)

*Primary Examiner* — Thomas D Lee
(74) *Attorney, Agent, or Firm* — Scully, Scott, Murphy & Presser, PC

(57) ABSTRACT

A printer includes a printing engine, an interface, and a controller. The controller is configured to perform obtaining a file from an external storage device; determining whether the file has information representing a specific function; in response to determining that the file has the information, sending to a server a data request; receiving data on the updates from the server; outputting the data on the updates received from the server and an image based on the file to cause the printing engine to print the image. In response to not determining that the file has the information, the data request is not sent to the server.

13 Claims, 5 Drawing Sheets

(56) References Cited

U.S. PATENT DOCUMENTS

| | | |
|---|---|---|
| 2007/0067104 A1 | 3/2007 | Mays |
| 2007/0223034 A1 | 9/2007 | Matsumoto |
| 2009/0009802 A1 | 1/2009 | Shaw et al. |
| 2010/0238483 A1 | 9/2010 | Nelson et al. |
| 2015/0242383 A1 | 8/2015 | Arputharaj et al. |
| 2018/0253412 A1 | 9/2018 | Biswas |
| 2019/0019022 A1 | 1/2019 | Marda et al. |

FOREIGN PATENT DOCUMENTS

| | | |
|---|---|---|
| JP | 2007-259127 A | 10/2007 |
| JP | 2010-003127 A | 1/2010 |
| JP | 2012-103891 A | 5/2012 |
| JP | 2012-245751 A | 12/2012 |
| JP | 2014-044564 A | 3/2014 |
| JP | 2017-021654 A | 1/2017 |

OTHER PUBLICATIONS

Office Action dated Nov. 29, 2019, received in U.S. Appl. No. 16/368,948, 16 pages.
Notice of Allowance dated Jun. 9, 2020, received in U.S. Appl. No. 16/368,948, 8 pages.
Notification of Reasons for Refusal dated Sep. 28, 2021, received in Japanese Patent Application No. 2018-068006, 15 pages.

Fig. 4

```
XML FILE
  < USER NAME AAA < / > >
  < E-MAIL ADDRESS BBB@_____ < / > >
  < DATA ON REVIEW CONTENT 1 ccc < / > >
  < DATA ON REVIEW CONTENT 2 ddd < / > >
  < COORDINATES (x, y), PAGE NUMBER e < / > >
```

PRINTER AND NON-TRANSITORY COMPUTER READABLE STORAGE MEDIUM WITH SHARED REVIEW FUNCTION

CROSS-REFERENCE TO RELATED APPLICATION

This application is a continuation of U.S. application Ser. No. 16/368,948, filed Mar. 29, 2019, which claims priority from Japanese Patent Application No. 2018-068006 filed on Mar. 30, 2018, the entire subject-matter of which is incorporated herein by reference.

FIELD OF DISCLOSURE

Aspects described herein relate to a printer and a non-transitory computer readable storage medium for the printer.

BACKGROUND

A known system provides a shared review function where a document or a file can be shared among users. More specifically, a user of the system sends a file to be reviewed, from his/her terminal device to other users' (e.g., recipients') terminal devices, as well as to a server. Each recipient may review the file and make markups, comments, annotations, and/or changes (which may be collectively referred to as "updates"). Each reviewer may send or upload data on the updates, via a his/her terminal device, to the server, so that the server may store the data on the updates. Each user may synchronize his/her individual file to incorporate those updates into his/her individual file. This may allow a user to view the updates made by other users.

SUMMARY

Once such file is stored in an external storage device for printing, the file stored in the external storage device may not include updates, even if additional updates are available from the server. One or more aspects described herein provide a technique of making updates on a document or a file using a printer.

One illustrative aspect of the disclosure may provide a printer, comprising: a printing engine; a particular interface; and a controller configured to perform steps comprising: obtaining a file from an external storage device through the particular interface; determining whether the file has information representing a specific function, the specific function allowing users of a plurality of terminal devices to make updates on the file shared between the users, and to send, to a server, data on the updates; in response to determining that the file has the information representing the specific function, sending, to the server, a data request for the data on the updates; receiving the data on the updates from the server; outputting the data on the updates received from the server and an image based on the file to cause the printing engine to print the image. In response to not determining that the file has the information representing the specific function, the data request is not sent to the server.

Another illustrative aspect of the disclosure may provide one or more non-transitory computer readable storage media storing instructions for a printer, comprising a printing engine, a particular interface, and a controller, that when executed by the controller, cause the printer to: obtain a file from an external storage device through the particular interface; determine whether the file has information representing a specific function, the specific function allowing users of a plurality of terminal devices to make updates on the file shared between the users, and to send, to a server, data on the updates; in response to determining that the file has the information representing the specific function, send, to the server, a data request for the data on the updates; receive the data on the updates from the server; output the data on the updates received from the server and an image based on the file to cause the printing engine to print the image. In response to not determining that the file has the information representing the specific function, the data request is not sent to the server.

Computer programs for causing a computer to function as the printer have novelty and utility. Control methods for implementing the printer have novelty and utility. Computer-readable storage media storing the computer programs also have novelty and utility.

BRIEF DESCRIPTION OF THE DRAWINGS

FIG. 4 illustrates an XML file that is stored in a server of the share system and includes review data.

DETAILED DESCRIPTION

Referring to FIGS. 1-5, an illustrative embodiment will now be described.

[1. Configuration]

<Overall Configuration>

Figure 1:
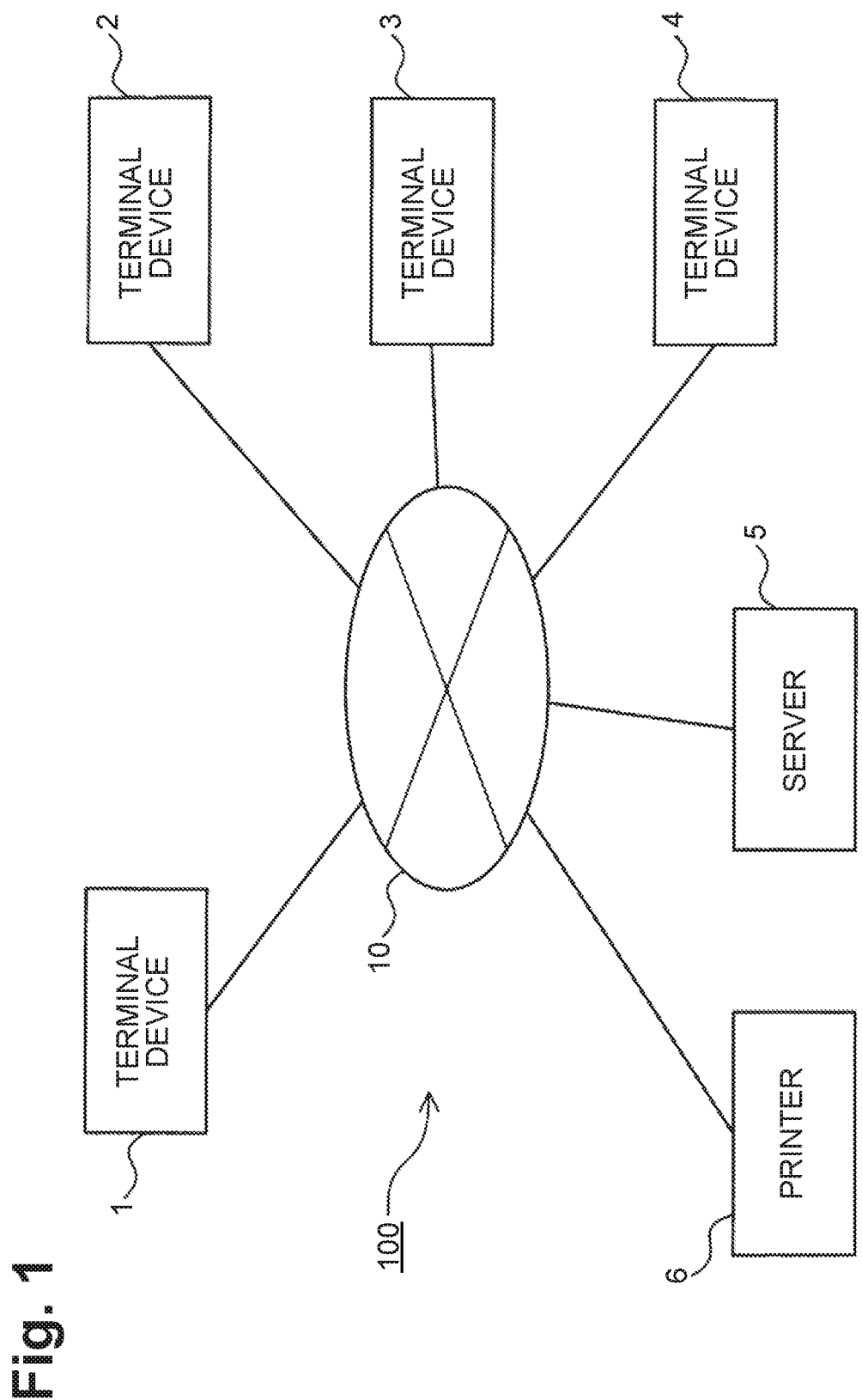
FIG. 1 is a block diagram of a share system including a printer according to one or more aspects of the disclosure.

As depicted in FIG. 1, a share system 100 includes a plurality of terminal devices 1-4, a server 5, and a printer 6. In the share system 100, the terminal devices 1-4, the server 5, and the printer 6 are configured to communicate with each other via a communication network 10.

The share system 100 is configured to execute a "shared review" function where a file can be shared between a plurality of users (e.g., users of the terminal devices 1-4). For example, a first user of a first terminal device sends a file to a second user of a second terminal device. The second user may review the file and post to the server 5 review data on the file.

The review data may include data on a review content, such as a markup, a comment, an annotation, and/or a change (which may be collectively referred to as "updates"), as well as attributes of a user who has posted the review content. Such user attributes in the illustrative embodiment may include, but not be limited to, a user name and a user's e-mail address. The review data may further include, but not be limited to, data on where and when a review content is input in the file.

The shared review function will now be described in detail below. In an example given below, a user A of the terminal device 1 has created a file, and the file is shared with users B, C and D of other terminal devices 2-4. In illustrative embodiment, each of the terminal devices 1-4 may be a general-purpose computer. In some embodiments, a terminal device may be a smartphone or a tablet.

The user A may prepare a file using the terminal device 1. Each terminal device 1-4 includes a particular application for creating, viewing, reviewing, and revising/modifying a file, as well as posting review contents on the file. In the illustrative embodiment, the file may be a portable document format ("PDF") file. The user A sends a PDF file (e.g., an original file) from the terminal device 1 to a respective one of the terminal devices 2-4 and the server 5, so that each of the terminal devices 2-4 and the server 5 has a copy of the PDF file. In one example, the user A designates a storage location where the PDF file is to be stored in the server 5. The location may be identified by a network path or a uniform resource locator ("URL") of the server 5 on the network 10. The user A also designates e-mail addresses of the recipients' users B, C, and D. In the illustrative embodiment, the PDF file has such settings designated by the user A, e.g., the file storage location and the recipients' e-mail addresses. The PDF file may be sent, as an e-mail attachment, to a respective one of the users B, C, and D. The users B, C, and D may operate their respective terminal devices 2, 3, and 4 to see the email and the attached file. The PDF file is also sent to the server 5 and is stored in the server 5.

In the illustrative embodiment, the user A may designate a review deadline. Until the review deadline, other users B, C, and D may be allowed to upload review data on the PDF file. After the review deadline, no review data may be uploaded. The PDF file also has the setting of the designated review deadline.

The users B, C, and D may review an individual copy of the PDF file and make updates, such as markups, comments, annotations, and/or changes. The users B, C and D may send review data on the PDF file to the server 5. In other words, each user B, C, and D may make updates on the PDF file shared therebetween. Each of the terminal devices 2-4 sends data on the updates to the server 5. In some embodiments, the user A may also make updates and send review data on the PDF file to the server 5. The server 5 stores therein a copy of the PDF file sent from the terminal device 1, as well as the review data, sent from the respective terminal devices 2-4, on the PDF file.

Each user A-D may synchronize his/her individual PDF file locally stored in his/her terminal device 1-4 such that the review data stored in the server 5 are incorporated or merged into the individual PDF file. In the illustrative embodiment, when the PDF file is opened on the particular application on the terminal device 1-4, the synchronization may be carried out. Synchronization may also be carried out by operating a particular software button displayed on the particular application. For example, when the synchronization is carried out on the terminal device 1, review data from other users B, C and D are merged into the PDF file stored in the terminal device 1, so that the user A can view the review contents, such as comments, made by other users B, C and D. This is brief description of the "shared review" function.

In the illustrative embodiment, the printer 6 is configured to send and receive updates, e.g., review data, to and from the server 5. The printer 6 is also configured to print an image of a PDF file, by incorporating reviewed data, on the file, stored in the server 5, into the file. Such configuration of the printer 6 may be helpful in a following case. For example, the user A stores a copy of a PDF file, which may have review contents from other users B, C and D, into an external storage device, e.g., a USB memory, for printing by the printer 6. While the PDF file is stored in the USB memory, the server 5 may store additional review data on the file. The file stored in the USB memory may not receive the additional review data stored in the server 5, unless the USB memory is connected to the printer 6 or the terminal device 1. The printer 6 in this embodiment may execute printing based on the PDF file including the latest updates or the additional review data obtained from the server 5. An example of how such printing is carried out will be described in further detail below.

A USB memory is plugged into the terminal device 1 to save a PDF file into the USB memory. The PDF file stored in the USB memory includes information, such as the file storage location (e.g., a network path or URL of the server 5), the review deadline, and reviewer information (e.g., user names and e-mail addresses of reviewers). The reviewer information will be described in more detail below.

<Configuration of Printer>

Figure 2:
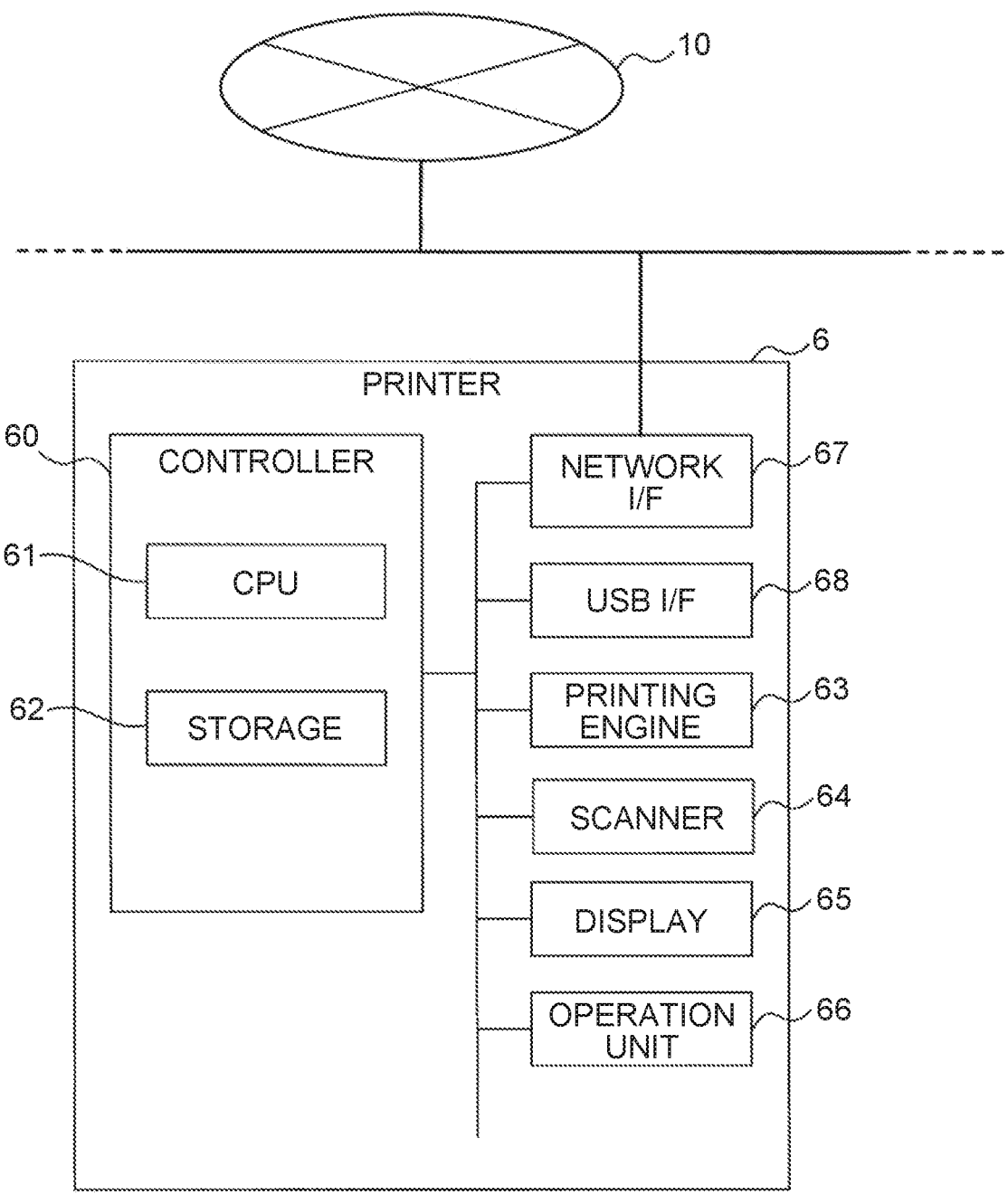
FIG. 2 is a block diagram illustrating configuration of the printer.

As depicted in FIG. 2, the printer 6 includes a controller 60, a printing engine 63, a scanner 64, a display 65, a user interface 66, a network interface ("I/F") 67, and a USB interface ("I/F") 68.

The controller 60 includes a microcomputer including at least a CPU 61 and a storage 62. The CPU 61 is configured to execute programs stored in a non-transitory computer-readable medium to implement various functions. In illustrative embodiment, the storage 62 may be an example of a non-transitory computer-readable medium storing programs. The storage 62 includes at least one semiconductor memory, such as a ROM, a RAM, or a flash memory. It should be noted that a part of or all of functions, which are implemented by the CPU 61 executing programs, may alternatively be implemented by hardware of logical circuits, analog circuits and/or combinations thereof. The controller 60 is configured to execute programs stored in the storage 62, thereby executing processing, such as direct print processing depicted in FIG. 3, and review data posting processing depicted in FIG. 5.

The printing engine 63 is configured to print an image onto a print medium. The printing engine 63 may execute printing in an inkjet method, an electrophotographic method, or other methods.

The scanner 64 includes an image sensor. The scanner 64 is configured to scan an image on a document and generate scanned data, e.g., image data of the scanned image.

The display 65 may be a liquid crystal display configured to display an image.

The user interface 66 is configured to receive user's inputs. The user interface 66 includes an input device, such as a touchscreen panel and buttons/keys. The touchscreen panel is overlaid on an image displaying area of the display 65.

The network I/F 67 allows the printer 6 to connect to the communication network 10. The network I/F 67 connecting to the communication network 10 allows the printer 6 to communicate with the server 5 and the terminal devices 1-4. Examples of the communication network 10 include a wired LAN, a wireless LAN, and the Internet.

The USB I/F 68 allows a USB device to connect thereto for data communication or data exchange with the printer 6.

[2. Processing]

[2-1. Direct Print Processing]

Referring to the flowchart of FIG. 3, the direct print processing will now be described. The controller 60 of the printer 6 executes the direct print processing. The direct print processing may be periodically executed while the printer 6 is on.

At S101, the controller 60 determines whether user authentication is successful. The printer 6 possesses authentication information registered in the storage 62 on one or more users having a predetermined authority. In one example, the authentication information of a user may include a name and/or an e-mail address of the user. The controller 60 determines whether the authentication information received from a user matches the registered authentication information. If the authentication information received from the user matches the registered authentication information, the controller 60 determines that the user authentication is successful and the user is authenticated.

In the illustrative embodiment, the controller 60 determines that the user having the predetermined authority is allowed to use a direct print function of the printer 6. The direct print function allows the printer 6 to print an image based on a file stored in a medium (e.g., a USB memory). The direct print function does not cause the printer 6 to receive a file from a network.

To receive authentication information from a user at S101, the controller 60 causes the display 56 to display an input screen that encourages the user to input his/her authentication information in the input screen. The user may input his/her authentication information to the input screen through the user interface 66. The controller 60 may thus obtain the authentication information of the user. In some embodiments, an IC card storing authentication information of a user may be used. When the user places the IC card close proximity to an antenna portion of the printer 6, the controller 60 may obtain authentication information of the user from the IC card. The authentication information includes various information, such as a user name, a password, and a user's e-mail address.

If the controller 60 determines, at S101, that the user authentication is not successful, the controller 60 returns to S101. If the controller 60 determines, at S101, that the user authentication is successful, the controller 60 proceeds to S102 at which the controller 60 determines whether a USB memory is plugged into the USB I/F 68. If the controller 60 determines, at S102, that no USB memory is plugged into the USB I/F 68, the controller 60 finishes the direct print processing in FIG. 3.

If the controller 60 determines, at S102, that a USB memory is plugged into the USB I/F 68, the controller 60 proceeds to S103 at which the controller 60 determines whether to execute the direct print function. In the illustrative embodiment, if the controller 60 determines, at S101, that the user authentication is successful, the controller 60 causes the display 65 to display a software button for executing the direct print function. Based on determining that the software button has been activated, the controller 60 determines to execute the direct print function. If the software button has not been activated for a predetermined period of time since the button was displayed, the controller 60 determines not to execute the direct print function.

Figure 3:
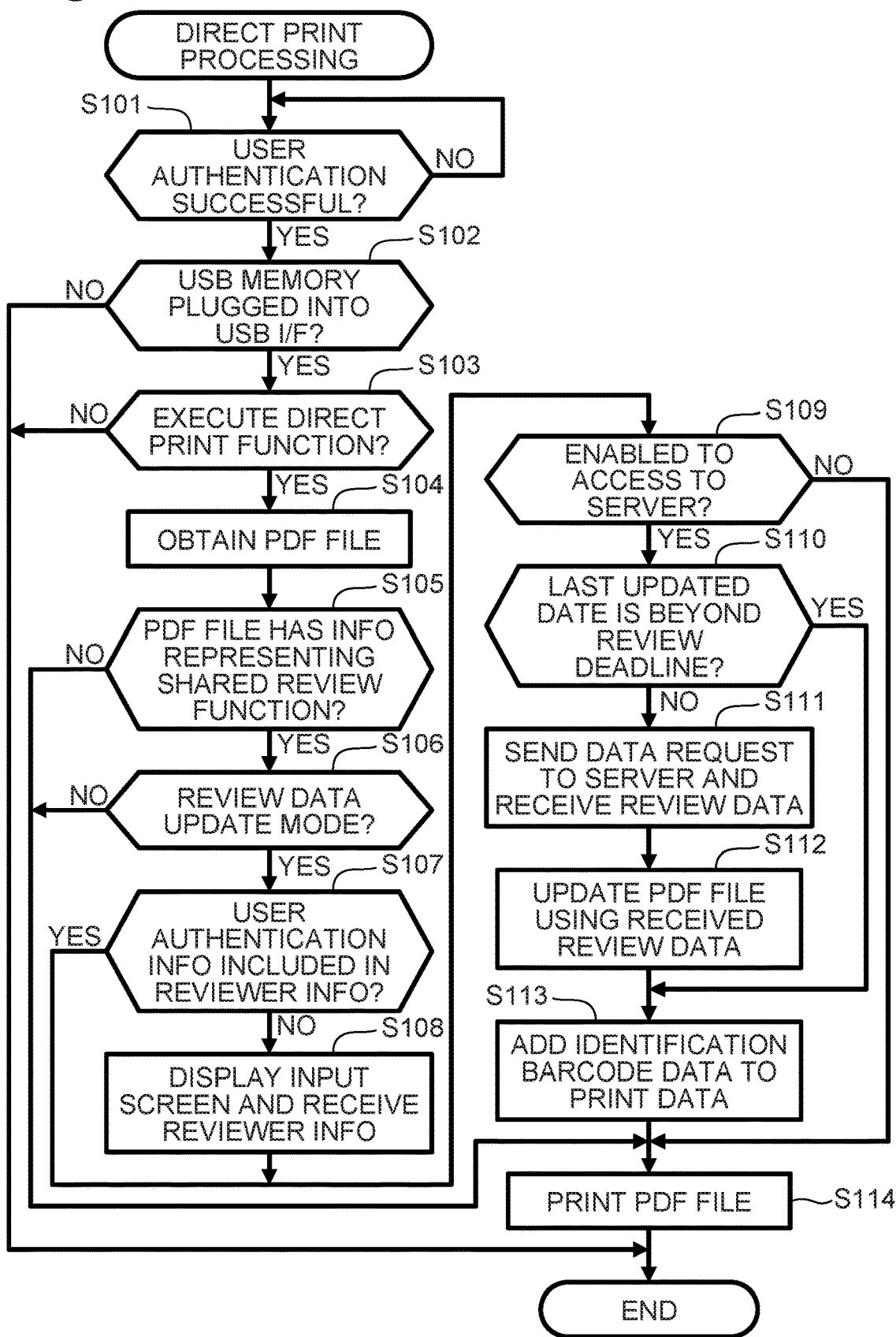
FIG. 3 is a flowchart of direct print processing.

If the controller 60 determines, at S103, not to execute the direct print function, the controller 60 finishes the processing in FIG. 3. If the controller 60 determines, at S103, to execute the direct print function, the controller 60 proceeds to S104.

At S104, the controller 60 obtains a PDF file from the USB memory plugged into the USB I/F 68. The controller 60 may store the obtained PDF file into the storage 62 and scan through the PDF file.

Subsequently, at S105, the controller 60 determines whether the PDF file obtained at S104 has information representing a "shared review" function. In the illustrative embodiment, the information representing the "shared review" function may include a network path or URL of the server 5 where the file and review data on the file are stored. The controller 60 determines whether the PDF file obtained at S104 has the information representing the network path or URL of the server 5.

If the controller 60 determines, at S105, that the PDF file does not have the information representing the "shared review" function, the controller 60 proceeds to S114 at which the controller 60 causes the printing engine 63 to print an image based on the PDF file. Upon completing S114, the controller 60 finishes the direct print processing in FIG. 3.

If the controller 60 determines, at S105, that the PDF file has the information representing the "shared review" function, the controller 60 proceeds to S106 at which the controller 60 determines whether the printer 6 is in a review data update mode or a review data non-update mode. In the illustrative embodiment, a user may select the review data update mode or the review data non-update mode in the printer 6.

In the review data update mode, the printer 6 receives review data from the server 5 and merges the received review data into the PDF file, thereby updating the PDF file. The printer 6 then prints an image based on the updated PDF file including the received review data. In the review data non-update mode, the printer 6 does not receive review data from the server 5 nor update a PDF file, regardless of whether the PDF file has the information representing the shared review function. In the review data non-update mode, printing is executed based on the PDF file as obtained at S104.

If the controller 60 determines, at S106, that the printer 6 is in the review data non-update mode, the controller 60 proceeds to S114 at which the controller 60 causes the printing engine 63 to print an image based on the PDF file as obtained at S104. At this time, the controller 60 causes the printing engine 63 to print an image based on the PDF file without receiving any additional review data from the server 5. Upon completing S114, the controller 60 finishes the direct print processing in FIG. 3.

If the controller 60 determines, at S106, that the printer 6 is in the review data update mode, the controller 60 proceeds to S107 at which the controller 60 determines whether the user authentication information input at S101 is included in reviewer information in the PDF file. The reviewer information is information that identifies one or more users who use the "shared review" function (e.g., the users of the terminal devices 1-4). In the illustrative embodiment, the reviewer information includes attributes of the respective users of the terminal devices 1-4, such as user names and users' e-mail addresses. The PDF file has the setting of the reviewer information, as described above. In one example, at S107, the controller 60 may determine whether the user name or the e-mail address included in the user authentication information matches a user name or an e-mail address included in the reviewer information.

If the controller 60 determines, at S107, that the user authentication information is not included in the reviewer information, the controller 60 causes the display 65 to display an input screen that encourages the user to input reviewer information. The controller 60 thus outputs a request for a reviewer information input. The controller 60 may receive reviewer information from the user via the user interface 66. Subsequent to receiving the reviewer information at S108, the controller 60 proceeds to S109.

If the controller 60 determines, at S107, that the user authentication information is included in the reviewer information, the controller 60 proceeds to S109 without executing S108.

At S109, the controller 60 determines whether the printer 6 is enabled to access the server 5. In the illustrative embodiment, when the printer 6 is connected to the communication network 10, the controller 60 determines that the printer 6 is enabled to access the server 5.

If the controller 60 determines, at S109, that the printer 6 is enabled to access the server 5, the controller 60 proceeds to S110 at which the controller 60 determines whether a last updated date of the PDF file (which is obtained at S104) is beyond the review deadline. The last updated date of the PDF file may be a date at which the PDF file was stored into a USB memory. The controller 60 refers to properties of the PDF file to obtain its last updated date. In the illustrative embodiment, a user may designate a review deadline in a PDF file, as described above. The controller 60 obtains the review deadline from the PDF file.

If the controller 60 determines, at S110, that the last updated date of the PDF file is not beyond the review deadline, the controller 60 proceeds to S111 at which the controller 60 sends, to the server 5, a data request for current review data and, in response, receives the review data currently stored in the server 5.

The server 5 stores therein an eXtensible Markup Language ("XML") file including review data, as depicted in FIG. 4.

Every time review data is uploaded to the server 5, the review data is written into an XML file. In one example, review data written into the XML file may include a name and an e-mail address of a reviewer, data on a review content, and a portion/location of the PDF file to which the review content is directed (e.g., a page number and a set of x and y coordinates). The XML file may not necessarily specify a review content itself, but may include reference to a file storing data on the review content.

After receiving the data request from the printer 6, the server 5 refers to the XML file and obtains the review data. In the illustrative embodiment, the data request from the printer 6 includes the last updated date of the PDF file. The server 5 obtains from the XML file, if any, additional review data stored therein later than the last updated date of the PDF file. The server 5 may send the additional review data to the printer 6.

Subsequently, at S112, the controller 60 updates the PDF file obtained at S104, by incorporating or merging the additional review data received from the server 5 into the PDF file. For example, the controller 60 may incorporate or add the received review contents and attributes of user(s), to the locations represented in the review data. Subsequent to executing S112, the controller 60 proceeds to S113.

If the controller 60 determines, at S110, that the last updated date of the PDF file is beyond the review deadline, the controller 60 proceeds to S113 without executing S111 and S112. If the controller 60 determines that the last updated date of the PDF file is beyond the review deadline, the controller 60 does not send a data request to the server 5, so that the PDF file may not be updated. A PDF file with its last updated date beyond the review deadline may be considered including all review data sent to the server 5 by the review deadline.

At S113, the controller 60 adds identification barcode data to print data of a respective page of the PDF file.

The identification barcode data includes data of an identification barcode image representing or encoding reviewer information, server information, and page number information. The reviewer information input at S101 or S108 is encoded as an identification barcode image, which may include information that identifies a user who has logged into the printer 6 (e.g., a user who uses the direct print function of the printer 6). The server information includes information that identifies the server 5 storing review data on the PDF file. In the illustrative embodiment, the server information represents a network path or URL of the server 5. The page number information represents a page number of page data including the identification barcode image.

Subsequent to executing S113, the controller 60 proceeds to S114 at which the controller 60 causes the printing engine 63 to print an image based on the PDF file. When printing is executed at S114 subsequent to S113, the printing engine 63 prints a composite image including an image of the PDF file including the latest updates (e.g., review data) obtained from the server 5 and the identification barcode image in the identification barcode data. The identification barcode image is indicated on a printout of a respective page of the PDF file.

Upon completing S114, the controller 60 finishes the direct print processing in FIG. 3.

[2-2 Review Data Posting Processing]

Referring to the flowchart of FIG. 5, the review data posting processing will now be described. The controller 60 of the printer 6 executes the review data posting processing. This processing may be periodically executed while the printer 6 is on. The processing may allow a user of the printer 6 (e.g., a user of the terminal device 1-4) to upload a review content added to a physical document (simply referred to as a "document") to the server 5, using the printer 6 without the intervention of the terminal devices 1-4. In the illustrative embodiment, the document corresponds to the PDF file. In other words, the document is a hard copy, i.e., a printout, of the PDF file. The review content added to the document may be uploaded to the server 5 using the identification barcode image on the printout of the PDF file. An example of how a review content on a document is uploaded to the server 5 will be described in further detail below.

The controller 60 obtains user authentication information of the printer 6 and determines whether user authentication is successful at S201, which is similar to S101. If the controller 60 determines, at S201, that the user authentication is not successful, the controller 60 returns to S201. The user authentication information may include information, such as a user name and/or an e-mail address of the user of the printer 6.

If the controller 60 determines, at S201, that the user authentication is successful, the controller 60 proceeds to S202 at which the controller 60 determines whether to start a "shared review" scan.

The "shared review" scan is a function that allows the controller 60 to cause the scanner 64 to scan manually-entered review contents, such as markups, comments, annotations, and/or changes (which may be collectively referred to as "updates") on a document (e.g., a printout of the PDF file). The term "manually-entered" may refer to, but not limited to, "hand-written", "hand-drawn", and "stamped". In the "shared review" scan, the scanner 64 scans an identification barcode image printed on the document.

In the illustrative embodiment, based on determining, at S201, that the user authentication is successful, the controller 60 causes the display 65 to display a software button for executing the "shared review" scan. Based on determining that the software button has been activated, the controller 60 determines to start the "shared review" scan. If the software button has not been activated for a predetermined period of time since the button was displayed, the controller 60 determines not to start the "shared review" scan.

Figure 5:
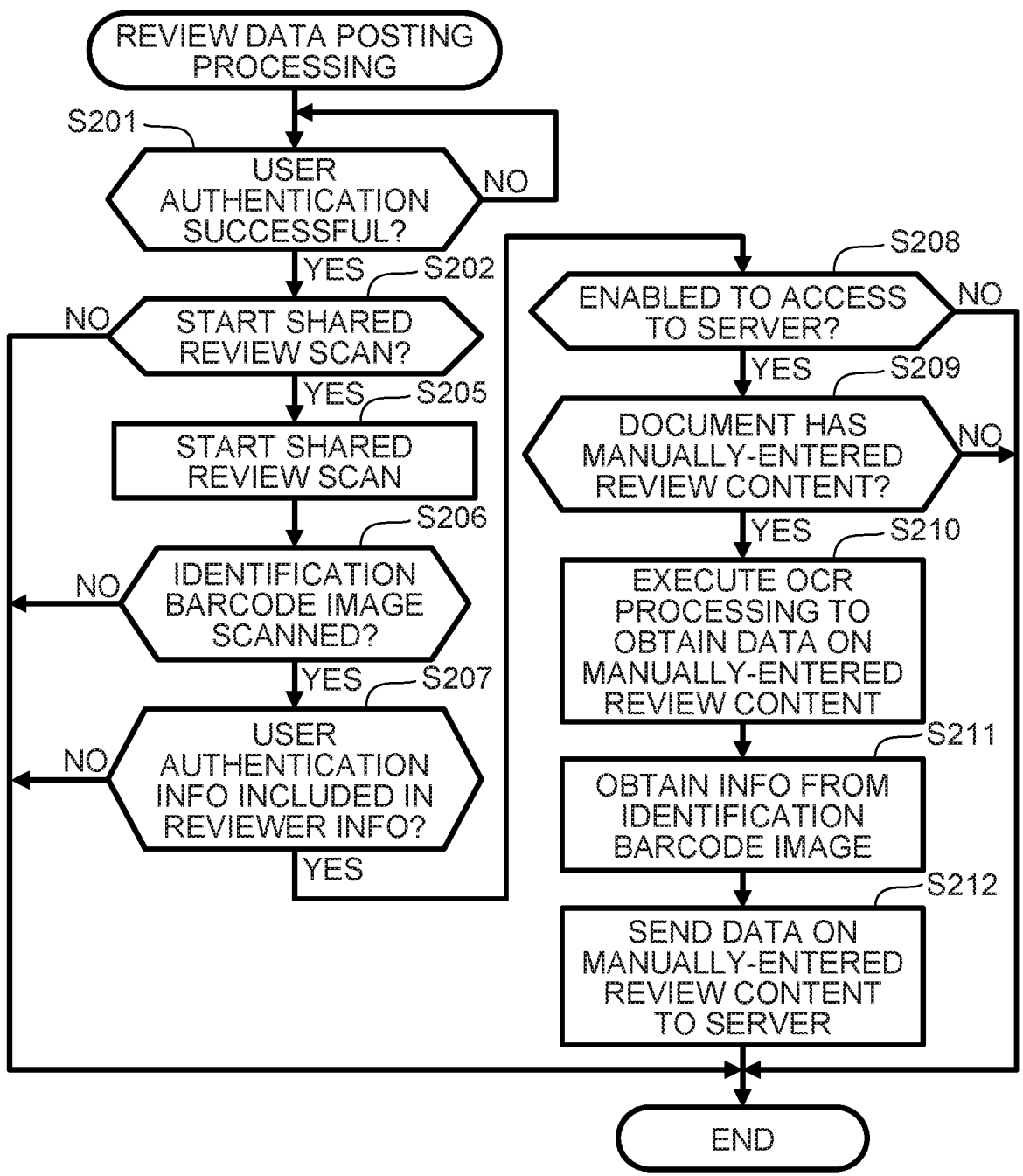
FIG. 5 is a flowchart illustrating review data posting processing

If the controller 60 determines, at S202, not to start the "shared review" scan, the controller 60 finishes the review data posting processing in FIG. 5. If the controller 60 determines, at S202, to start the "shared review" scan, the controller 60 proceeds to S205 at which the controller 60 starts the "shared review" scan.

Subsequently, the controller 60 determines, at S206, whether the identification barcode image has been scanned.

If the controller 60 determines, at S206, that the scanner 64 has not scanned the identification barcode image (i.e., the scanned data does not include data representing the identification barcode image), the controller 60 finishes the processing in FIG. 5.

If the controller 60 determines, at S206, that the scanner 64 has scanned the identification barcode image (i.e., the scanned data includes data representing the identification barcode image), the controller 60 proceeds to S207. At S207, the controller 60 determines whether the user authentication information input at S201 is included in the reviewer information encoded in the identification barcode image. In one example, at S207, the controller 60 may determine whether the user name or the e-mail address included in the user authentication information matches a user name or an e-mail address included in the reviewer information encoded in the identification barcode image.

If the controller 60 determines, at S207, that the user authentication information input at S201 is not included in the reviewer information encoded in the identification barcode image, the controller 60 finishes the processing in FIG. 5. If the controller 60 determines, at S207, that the user authentication information input at S201 is included in the reviewer information encoded in the identification barcode image, the controller 60 proceeds to S208, which is identical to S109.

If the controller 60 determines, at S208, that the printer 6 is not enabled to access the server 5, the controller 60 finishes the processing in FIG. 5.

If the controller 60 determines, at S208, that the printer 6 is enabled to access the server 5, the controller 60 proceeds to S209 at which the controller 60 determines whether the document has a manually-entered review content. In detail, the controller 60 determines, at S209, a location of the manually-entered review content. The controller 60 may determine whether the document has a manually-entered review content and, if any, determines the location of the manually-entered review content, for example, in a manner as described below.

A user may manually enter a review content, on a particular page of the document and may enclose the review content in a loop (e.g., a circle, a box, or a frame) of a particular color (e.g., red), to visually emphasize the manually-entered review content.

If detecting the loop, the controller 60 determines that the document has a manually-entered review content.

The controller 60 may detect a loop, for example, in the following sequences. The controller 60 calculates a luminance value of a respective one of two or more RGB pixels of the scanned data. If the luminance value of a RGB pixel of the scanned data falls within a numeral range that corresponds to a red color (e.g., a color of the loop), the controller 60 determines the RGB pixel as an ON pixel. If the luminance value of a RGB pixel of the scanned data does not fall within a numeral range that corresponds to a red color, the controller 60 determines the RGB pixel as an OFF pixel. This may create an ON/OFF image data that includes ON pixels corresponding to a red color and OFF pixels corresponding to colors other than red. The controller 60 determines, based on the ON/OFF image data, the ON pixels constituting a loop. The controller 60 determines locations of the respective ON pixels, thereby detecting the loop and consequently a manually-entered review content enclosed in the loop. In some embodiments, the terminal 60 may detect a loop by performing pattern matching of scanned data with a particular shape or pattern, e.g., a circular or a rectangular shape/pattern. The controller 60 may detect a loop in a different manner. The controller 60 may determine, at S209, the location of a manually-entered review content as a top-left coordinate of a boundary box of a loop. The boundary box may be a rectangle circumscribed around a loop.

If the controller 60 determines, at S209, that the document has no manually-entered review contents, the controller 60 finishes the processing in FIG. 5.

If the controller 60 determines, at S209, that the document has a manually-entered review content, the controller 60 proceeds to S210 at which the controller 60 executes a known optical character recognition ("OCR") processing to obtain data on the manually-entered review content (e.g., text data of the manually-entered review content).

Subsequently, at S211, the controller 60 obtains information, such as the reviewer information, the server information, and the page number information, from the data of the identification barcode image on the particular page having the manually-entered review content. At S211, the controller 60 obtains a page number of the particular page, from the page number information.

Subsequently, at S212, the controller 60 sends or uploads data on the manually-entered review content, to the server 5. In one example, the controller 60 sends data on the review content obtained at S210 and data on the location of the review content obtained at S209, to the server 5, which is identified by the server information obtained at S211. The controller 60 also sends, to the server 5, the reviewer information (e.g., information on a reviewer who may have manually entered the review content) obtained at S211, and information on time (e.g., date) when the reviewer information was obtained at S211 from the identification barcode image. Upon completing S212, the controller 60 finishes the review data posting processing in FIG. 5.

[3. Effects]

According to one or more aspects described herein, the following effects or technical advantages may be obtained.

(1) In the illustrative embodiment, if the controller 60 determines that a PDF file has the information representing the "shared review" function, the controller 60 may send a data request to the server 5 and, in response, may receive review data from the server 5. Based on the received review data, the controller 60 updates the PDF file, using the received review data. The controller 60 causes the printing engine 63 to print an image based on the updated PDF file. For a PDF file stored in a USB memory, the printer 6 executes printing based on the updated PDF file.

(2) In the illustrative embodiment, the controller 60 obtains or receives, from a USB memory, a PDF file that is stored from any one of the terminal devices 1-4 into the USB memory. The controller 60 may update the PDF file using additional review data that has been stored in the server 5 since the PDF file was stored in the USB memory (e.g., the last updated date of the PDF file). The PDF file in the USB memory is not updated unless the USB memory is connected to the printer 6 or any terminal devices 1-4. When the USB memory storing the PDF file is plugged into the printer 6, the printer 6 may update the PDF file in the USB memory for printing, using review data that has been uploaded to the server 5 since the PDF file was stored in the USB memory (e.g., the last updated date of the PDF file).

(3) In the illustrative embodiment, in response to plugging the USB memory into the USB I/F 68, the controller 60 obtains a PDF file from the USB memory. When direct printing is instructed, the printer 6 may execute printing based on the updated PDF file including updates.

(4) In the illustrative embodiment, a user may select the review data update mode or the review data non-update mode. In other words, the user may determine whether to update a PDF file. This may enhance user's convenience as compared with configuration that has only one mode (e.g., the review data update mode).

(5) In the illustrative embodiment, the controller 60 executes OCR processing to obtain data on a manually-entered review content and sends the obtained data to the server 5.

This may allow the users of the terminal devices 1-4 to send data on a review content to the server 5, without using their own terminal devices 1-4 but using the printer 6. Some users of the terminal devices 1-4 may prefer manually entering a review content to a document (e.g., a hard copy or printout of the PDF file). The printer 6 may allow the users to send data on a review content on the document to the server 5. This may enhance user's convenience as compared with configuration of conventional printers that do not allow a user to send, to the server 5, data on manually-entered review contents added to the document.

(6) In the illustrative embodiment, the controller 60 causes the printing engine 63 to print a composite image including an image of the updated PDF file including updates, and the identification barcode image.

Scanning the identification barcode image may allow the controller 60 to obtain the reviewer information and the server information. Using the obtained information, the controller 60 sends data on manually-entered review contents to the server 5. This may enhance user's convenience as compared with configuration that allows the controller 60 to obtain inputs of information, such as reviewer information, only via the user interface 66.

(7) In the illustrative embodiment, the controller 60 causes the scanner 64 to scan the identification barcode image printed on a document, thereby obtaining the reviewer information and the server information. The controller 60 executes OCR processing to obtain data on a manually-entered review content. The controller 60 sends, to the server 5 which is identified by the server information, the data on the manually-entered review content and the reviewer information, which may identify a user authenticated by the printer 6.

The controller 60 sends data on a manually-entered review content, using the reviewer information and the server information obtained by scanning the identification barcode image. This configuration may allow a user to readily send the data on the manually-entered update to the server 5, as compared with configuration that allows the controller 60 to obtain inputs of information, such as reviewer information, only via the user interface 66.

(8) In the illustrative embodiment, the controller 60 determines whether the last updated date of the PDF file is beyond the review deadline. Based on determining that the last updated date of the PDF file is not beyond the review deadline, the controller 60 sends a data request to the server 5. Based on determining that the last updated date of the PDF file is beyond the review deadline, the controller 60 may not send a data request to the server 5.

A PDF file with its last updated date which is not beyond the review deadline may not include all the review data that have been send to the server 5 since the PDF file was stored in the USB memory. A PDF file with its last updated date which is beyond the review deadline may be considered having all the review data, in the server 5, incorporated into the PDF file. This configuration may reduce or eliminate unnecessary data requests.

(9) In the illustrative embodiment, information (e.g., a user name and an e-mail address) to be used for determining a user of the "shared review" function (e.g., the user of the terminal devices 1-4) may be input through the user interface 66.

This may enhance user's convenience as compared with configuration that does not allow a user to input, through the user interface 66, information required for updating a PDF file.

(10) In the illustrative embodiment, in response to receiving a data request from the printer 6, the server 5 refers to a XML file including review data, and obtains the review data. In response, the printer 6 receives the review data from the server 5.

Review data in the XML file may be readily identified, as compared with configuration in which review data is described in a comma separated value ("CSV") or other formats. As a result, the printer 6 may efficiently receive the review data.

(11) In the illustrative embodiment, a file may be a PDF file. The printer 6 may print an image of the PDF file with updates (e.g., including latest review data).

In the illustrative embodiment, the USB I/F 68 is an example of a particular interface. The USB memory is an example of an external storage device. The "shared review" function is an example of a specific function. Data on a review content is an example of data on an update. The review information update mode is an example of a first mode. The review information non-update mode is an example of a second mode.

[4. Modifications]

While the disclosure has been described in detail with reference to the specific embodiment thereof, various changes, arrangements and modifications may be applied therein as will be described below.

(1) Examples of the external storage device may include various types of flash memory cards. Examples of the particular interface may include such interfaces that communicatively couple to various types of flash memory cards, such as SD cards, mini SD cards, micro SD cards and similar cards. In the illustrative embodiment, the printer 6 receives or obtains a file through a USB memory. In some embodiments, a file may be obtained through a network, such as a wired LAN, a wireless LAN or the Internet.

In some embodiment, the external storage device may be any one of the terminal devices 1-4 itself. If the terminal devices 1-4 are not connected to the communication network 10, the file stored in the terminal devices 1-4 may not be updated. The printer 6 may obtain a file from an external storage device, e.g., a terminal device 1-4. Applying aspects described herein may allow the printer 6 to execute printing based on the file including the updates (e.g., based on the updated file).

(2) In the illustrative embodiment, the server 5 sends, to the printer 6, pieces of review data that have been sent or uploaded to the server 5 since the PDF file was stored in the USB memory (e.g., the last updated date of the PDF file). In some embodiments, for example, the server 5 may send all pieces of review data, on the PDF file, described in the XML file to the printer 6. The printer 6 may determines which pieces of the review data have not been incorporated into the PDF file. The printer 6 may incorporate, into the PDF file, pieces of review data which have not yet been incorporated into the PDF file.

(3) In some embodiments, the printer 6 may not have the review information non-update mode, so that the review information update mode may be selected. The printer 6 may have modes including the review information update mode and one or more modes other than the review information non-update mode. For example, the printer 6 may have such a mode in which the printer 6 prints no review data.

(4) In the illustrative embodiment, the printer 6 may obtain a manually-entered review content (e.g., an update) from a document corresponding to a file having information representing a "shared review" function. In some embodiments, the printer 6 may obtain a manually-entered review content from a document sheet that does not corresponding to the file.

(5) In some embodiments, if determining, at S206 in FIG. 5, that the identification barcode image has not been scanned (e.g., the identification barcode image is not printed on the document), the controller 60 may cause the display 65 to display a message that encourages a user to input the reviewer information and the server information. User's inputs cause the controller 60 to send data on a manually-entered review content, to the server 5, which is identified by the server information input by the user.

(6) In the illustrative embodiment, the printer 6 may print, on a physical copy of a file, an identification barcode image including the encoded user identification information that identifies a reviewer of the file, who may have logged into the printer 6. In some embodiment, the printer 6 may print an identification barcode image including other encoded information, for example, that identifies all users who uses a "share review" function on the file.

(7) In the illustrative embodiment, an identification barcode image is an example of a coded image as claimed. In some embodiments, the coded image may be a two-dimensional coded image, e.g., QR code. QR code is a registered trademark of DENSO WAVE INCORPORATED.

(8) In some embodiment, the printer 6 may be configured to send a data request to the server 5 even when the last updated date of the PDF file is beyond the review deadline, and to receive additional review data.

(9) Data on updates may be stored in a file, such as a CSV file, other than a XML file.

(10) In some embodiments, the information representing the "shared review" function may be other information than a network path or URL of the server 5.

(11) In some embodiments, a manually-entered review content may be obtained without executing OCR processing. For example, a manually-entered review content may be obtained as an image rather than a text.

(12) A part of or all of functions, which are executed by the controller 60, may be implemented by hardware configured by one or more ICs.

(13) A plurality of functions described above may be implemented by a single element or a plurality of elements. Any single function described above may be implemented by a single element or a plurality of elements. Configuration of the above-described embodiment may be partially omitted. Further, at least a part of the configuration in the illustrative embodiment, may be added to or replaced with a configuration of another embodiment. All aspects included in the technical concept specified by the wordings of the scope of the claims is deemed as an embodiment of the disclosure.

What is claimed is:

1. A printer, comprising:
   a printing engine;
   a particular interface; and
   a controller configured to perform steps comprising:
   obtaining a file from an external storage device through the particular interface wherein a copy of the file is stored in a server;
   determining whether the file obtained from the external storage device has information representing a specific function, the specific function allowing users of a plurality of terminal devices to make updates on the copy of the file stored in the server and allowing the users to send data on the updates to the server;
   in response to determining that the file has the information representing the specific function, sending, to the server, a data request for the data on the updates;
   receiving the data on the updates from the server; and
   outputting the data on the updates received from the server and an image based on the file to cause the printing engine to print the image,
   wherein, in response to not determining that the file has the information representing the specific function, the data request is not sent to the server.

2. The printer according to claim 1, wherein
   the file is stored into the external storage device from one of the plurality of terminal devices, and
   the data on the updates has been stored in the server since the file was stored in the external storage device.

3. The printer according to claim 1, wherein the particular interface is a USB interface,
   the external storage device is a USB memory, and
   the file is obtained from the USB memory when the USB memory is coupled to the USB interface.

4. The printer according to claim 1, wherein the controller is configured to perform further steps comprising:
   receiving a user's selection of a mode;
   in response to the user's selection of a first mode and determining that the file has the information representing the specific function, sending the data request to the server;
   in response to the user's selection of a second mode, sending no data request to the server regardless of whether the file has the information representing the specific function.

5. The printer according to claim 1, further comprising a scanner configured to scan an image on a document corresponding to the file;
   wherein the controller configured to perform further steps comprising:
   performing OCR processing for updates manually entered in the document; and
   sending data on the updates manually entered in the document, to the server.

6. The printer according to claim 1, wherein the controller is configured to perform further step comprising:
   causing the printing engine to print a composite image including the image based on the file, and a coded image;
   wherein the coded image includes user identification information that identifies a user of a terminal device, which is one of the plurality of terminal devices, and server information that identifies the server.

7. The printer according to claim 6, wherein the controller is configured to perform further steps comprising:
   obtaining authentication information including information of a printer user;
   authenticating the printer user based on the obtained authentication information;
   causing a scanner to scan a document corresponding to the file;

obtaining the user identification information from the coded image on the document;

determining whether the information of the printer user matches the user identification information;

in response to determining that the information of the printer user matches the user identification information, performing OCR processing for updates manually entered in the document, thereby obtaining data on the updates manually entered in the document;

obtaining server information from the coded image on the document; and sending the data on the updates manually entered in the document and the user identification information of the authenticated printer user, to the server identified by the server information.

8. The printer according to claim 1, wherein the file includes a last updated date at which the file was last updated, and review deadline by which an update on the file is accepted, the controller is configured to perform further steps comprising:

determining whether the last updated date of the file is beyond the review deadline; and in response to determining that the last updated date of the file is not beyond the review deadline, sending the data request to the server.

9. The printer according to claim 8, wherein if determining that the last updated date of the file is beyond the review deadline, the controller does not send the data request to the server.

10. The printer according to claim 1, further comprising:
a user interface configured to receive user's inputs;
wherein the controller is configured to perform further steps comprising:

obtaining authentication information through the user interface, the authentication information including information of a printer user.

11. The printer according to claim 1, wherein
the data on the updates is included in an XML file stored in the server, and
the controller receives the data on the updates when received the XML file from the server.

12. The printer according to claim 1, wherein the file is a PDF file.

13. One or more non-transitory computer readable storage media storing instructions for a printer, comprising a printing engine, a particular interface, and a controller, that when executed by the controller, cause the printer to:

obtain a file from an external storage device through the particular interface, wherein a copy of the file is stored in a server;

determine whether the file obtained from the external storage device has information representing a specific function, the specific function allowing users of a plurality of terminal devices to make updates on the copy of the file stored in the server and allowing the users to send data on the updates to the server;

in response to determining that the file has the information representing the specific function, send, to the server, a data request for the data on the updates;

receive the data on the updates from the server; and output the data on the updates received from the server and an image based on the file to cause the printing engine to print the image, wherein, in response to not determining that the file has the information representing the specific function, the data request is not sent to the server.

\* \* \* \* \*